(12) United States Patent
Geuvers et al.

(10) Patent No.: US 7,188,690 B2
(45) Date of Patent: Mar. 13, 2007

(54) DRILLING DEVICE AND METHOD FOR PRODUCING UNDERCUT HOLES

(76) Inventors: Paul Geuvers, c/o Powers Fasteners Europe BV J van Stolbergstraat 11, 1723 LB Noord-Scharwoude (NL); Paul Gaudron, 51 Stamford Ave., Stamford, CT (US) 06902

( * ) Notice: Subject to any disclaimer, the term of this patent is extended or adjusted under 35 U.S.C. 154(b) by 302 days.

(21) Appl. No.: 10/798,973

(22) Filed: Mar. 12, 2004

(65) Prior Publication Data

US 2005/0000732 A1 Jan. 6, 2005

(30) Foreign Application Priority Data

Mar. 13, 2003 (DE) ................................. 103 11 079

(51) Int. Cl.
*E21B 7/28* (2006.01)
*E21B 10/00* (2006.01)
*B23B 47/00* (2006.01)
*B23B 41/00* (2006.01)

(52) U.S. Cl. .................. 175/355; 175/82; 175/321; 175/408; 408/236; 82/1.2

(58) Field of Classification Search .............. 175/61, 175/79, 80, 82, 321, 325.1, 355, 408; 408/236; 82/1.2
See application file for complete search history.

(56) References Cited

U.S. PATENT DOCUMENTS

| 3,146,641 | A | * | 9/1964 | Benjamin et al. ............. 82/1.2 |
| 3,813,183 | A | * | 5/1974 | Abernathy et al. ........... 408/80 |
| 4,153,121 | A |   | 5/1979 | Allan |
| 4,444,279 | A | * | 4/1984 | Kessler et al. ............... 175/202 |
| 4,446,934 | A | * | 5/1984 | Muller ........................ 175/286 |
| 4,635,737 | A | * | 1/1987 | Miyanaga .................... 175/284 |
| 4,838,742 | A |   | 6/1989 | Fricker |
| 4,904,134 | A |   | 2/1990 | Fischer |
| 4,930,585 | A | * | 6/1990 | Noser et al. ................. 175/220 |
| 4,971,486 | A |   | 11/1990 | Rinklake et al. |
| 4,989,681 | A |   | 2/1991 | Lohmuller et al. |
| 4,993,894 | A |   | 2/1991 | Fischer et al. |
| 4,998,981 | A | * | 3/1991 | Miyanaga .................... 175/286 |
| 5,002,445 | A |   | 3/1991 | Fischer |
| 5,031,709 | A |   | 7/1991 | Fischer |
| 5,036,928 | A |   | 8/1991 | Mark |
| 5,063,724 | A |   | 11/1991 | vanden Boogaart |
| 5,076,743 | A | * | 12/1991 | Mark .......................... 408/151 |
| 5,090,848 | A |   | 2/1992 | Haug |
| 5,127,777 | A | * | 7/1992 | Fischer et al. .............. 409/130 |
| 5,163,789 | A |   | 11/1992 | Weber et al. |

(Continued)

FOREIGN PATENT DOCUMENTS

DE 315601 * 10/1919

(Continued)

*Primary Examiner*—Jennifer H. Gay
(74) *Attorney, Agent, or Firm*—Morgan Lewis & Bockius (57) ABSTRACT

A drilling device for producing undercut holes. The drilling device includes a drilling tool having an axis of rotation and a cutting portion arranged such that the cutting portion drills a hole with a longitudinal axis that is radially offset with respect to said axis of rotation and a centering device operable to apply a lateral force to said drilling tool for moving said axis of rotation towards said longitudinal axis to cause said cutting portion to form an undercut in a said hole.

10 Claims, 12 Drawing Sheets

U.S. PATENT DOCUMENTS

| | | | | |
|---|---|---|---|---|
| 5,226,763 A | * | 7/1993 | Lind | 408/236 |
| 5,540,527 A | | 7/1996 | Bohnet et al. | |
| 5,544,989 A | * | 8/1996 | Erath | 408/153 |
| 5,702,212 A | * | 12/1997 | Erath et al. | 408/153 |
| 6,022,176 A | * | 2/2000 | Spangenberg | 408/16 |
| 6,041,485 A | | 3/2000 | Pedlick et al. | |
| 2002/0194718 A1 | | 12/2002 | Yekutiely et al. | |

FOREIGN PATENT DOCUMENTS

| | | |
|---|---|---|
| DE | 2535066 A1 * | 3/1977 |
| DE | 3629562 C1 * | 11/1987 |
| DE | 088 08 256 U1 | 9/1988 |
| DE | 44 06 168 A1 | 8/1995 |
| DE | 196 10 478 A1 | 9/1997 |
| DE | 297 15 261 U1 | 12/1997 |
| EP | 0 211 997 A1 | 3/1987 |
| EP | 0 302 202 A2 | 2/1989 |
| EP | 0 321 673 A2 | 6/1989 |
| EP | 0 381 678 B1 | 8/1990 |
| EP | 0 417 420 A1 | 3/1991 |
| EP | 0 795 677 A2 | 9/1997 |
| GB | 595908 | 7/1945 |
| GB | 1 434 173 | 5/1976 |
| JP | 9-234729 | 9/1997 |
| JP | 2001-020648 | 1/2001 |
| JP | 2002-011717 | 1/2002 |
| WO | WO 97 18917 | 5/1997 |
| WO | WO 03 001070 A2 | 1/2003 |

* cited by examiner

DRILLING DEVICE AND METHOD FOR PRODUCING UNDERCUT HOLES

CROSS REFERENCE TO CO-PENDING APPLICATIONS

This invention claims the benefit of German Patent Application No. 103 11 079.8 filed on Mar. 13, 2003, which is hereby incorporated by reference.

FIELD OF THE INVENTION

The invention relates to a drilling device and method of working concrete, brickwork, stone or the like by means of a drilling operation to produce undercut holes.

BACKGROUND OF THE INVENTION

The production of cylindrical drill holes in materials such as concrete, brickwork, stone and the like using various techniques generally referred to as "drilling" is common. Often during above-ground, below-ground and street construction, for example, accurately positioned drill holes are needed, for example, for inserting fastening elements. Provided the holes are simple "passage holes", the process is relatively simple, since there are no special requirements on the shape or geometry of the hole, apart from the nominal diameter. Dowel connections on the other hand impose additional requirements on the shape of the drilled hole.

There are already a number of special methods of making so-called undercut holes for receiving heavy-duty dowel connections. The purpose of these methods is to improve the performance of the hole by shaping it so that the force needed to pull the fastening element out of the hole is increased. This applies in general, but in particular to cracked concrete. With cracked concrete, it is necessary to prevent the dowel connection from yielding or subsiding owing to the cracking, which would reduce the load-bearing capacity. A positive connection is clearly an advantage, particularly for filigree elements where there is a limit to the spreading-apart forces which can be absorbed by the component.

Methods for making undercut holes, based, for example, on German Utility Model No 8808 256.3 and U.S. Pat. No. 4,993,894, first require the drilling of a standard drill hole with conventional drilling tools and machines. Then, in a second operation, by means of a geometrically not easily definable operation that is frequently called "swivelling or wobbling", the cylindrical drill hole is widened at its inner end so that the inner end of an inserted dowel connector can become "wedged" in the hole. This enables a relatively defined positive connection to be made with the dowel connector.

Alternatively, there are special tools for making radial grooves in a standard drill hole and thus increasing its lateral roughness. These tools are used after drilling in a separate operation requiring a second working step. An example of such tools is disclosed in EP 0 795 677.

U.S. Pat. No. 4,989,681 and German Utility Model No 297 15 261 disclose the asymmetrical insertion of cutting edges, on the assumption that the axial force (action of pressure) and the cutting angle will result in an easily reproducible undercut.

In addition there are a number of devices on the market for working with movable, controlled cutting edges and blades. The difficulty usually is to remove the drilling dust on site and ensure unrestricted use under the rough conditions found at building sites. These methods and devices, hitherto in hand-guided versions, have not given satisfactory results with regard to the requirements of "widening" and "undercutting", and therefore have not been commercially successful.

SUMMARY OF THE INVENTION

In an embodiment, the invention provides a drilling device for producing undercut holes, said drilling device comprising a drilling tool having an axis of rotation and a cutting portion arranged such that it drills a hole with a longitudinal axis that is radially offset with respect to said axis of rotation and a centering device operable to apply a lateral force to said drilling tool for moving said axis of rotation towards said longitudinal axis to cause said cutting portion to form an undercut in a said hole.

In another embodiment, the invention provides a method of producing an undercut hole comprising the steps of: drilling a hole with a drilling tool that has a cutting portion arranged to produce a hole having a longitudinal axis that is radially offset with respect to an axis of rotation of said drilling tool; and applying a lateral force to said drilling tool to cause said axis of rotation to move towards said longitudinal axis.

In yet another embodiment, the invention provides a drilling device for producing undercut holes, said drilling device comprising: a drilling tool comprising a drill shaft that defines an axis of rotation of said drilling tool and a cutting portion carried at an end region of said shaft such that, in use, it drills a hole having a longitudinal axis that is radially offset with respect to said axis of rotation; and a centering device carried by said drilling tool, said centering device comprising an elongate member mounted so as to be slidable alongside said drill shaft into said hole to press against said drill shaft and apply a lateral force to said drill shaft, such that the axis of rotation is moved substantially into line with said longitudinal axis to cause said cutting portion to form an undercut in said hole, and at least one member connected with said elongate member by which a user of the driving device can move said elongate member alongside said drill shaft.

In yet another embodiment, the invention provides a method of producing an undercut hole, said method comprising: drilling a hole with a drilling tool that comprises a drill shaft having an axis of rotation and a cutting head that is positioned such that said hole has a longitudinal axis that is radially offset with respect to said axis of rotation; maintaining rotation of said drilling tool with said cutting head at a predetermined location in said hole and sliding an elongate member into said hole alongside between said drill shaft and a wall defining said hole to apply a lateral force to said drill shaft and thereby move said drill shaft to bring said axis of rotation substantially into line with said longitudinal axis causing said cutting head to widen said hole at said predetermined location to form an undercut.

In still another embodiment, the invention provides a drill device for producing undercut holes, said drilling device comprising: a drilling tool comprising a drill shaft that defines an axis of rotation of said drilling tool and a cutter carried at an end region of said drill shaft such that, in use, it drills a hole having a longitudinal axis that is radially offset with respect to said axis of rotation; and a centering device operable to apply a lateral force to said drilling tool for moving said axis of rotation towards said longitudinal axis to cause said cutter to form an undercut in a said hole, said centering device comprising: a centering member that is movable from a non-operative position outside of said hole to an operative position inside said hole in which the member is positioned between said drill shaft and a wall defining said hole so as to provide said lateral force; an operating device connected with said centering member by which an operator can move said centering member from said non-operative position to said operative position; a depth stop device by which a drilling depth of said hole is set; and a control device for said operating device, said control device being configured to prevent movement of said operating device by which said centering member is moved from said non-operative position to said operative position until said drilling tool has drilled said hole to said drilling depth set by said depth stop device.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
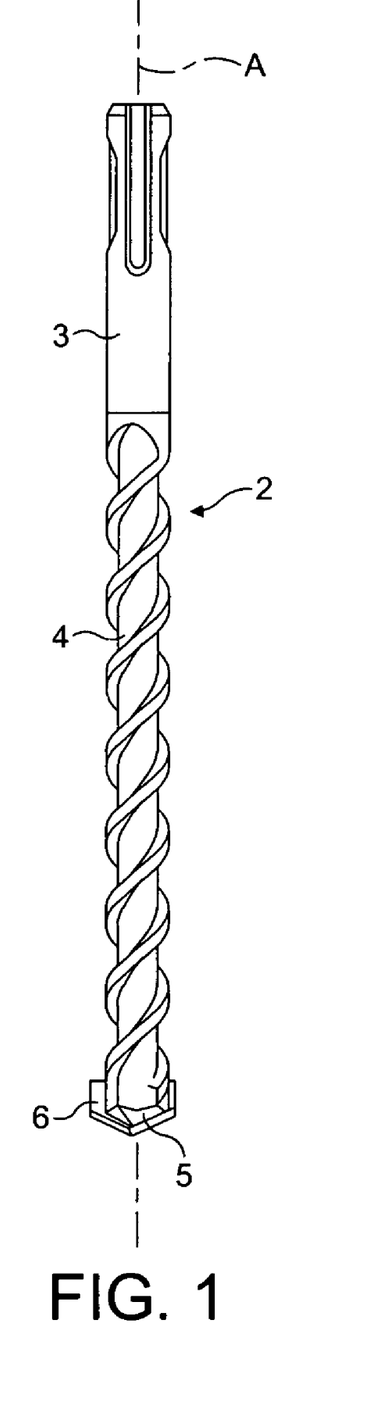
FIG. 1 shows a drilling tool of an embodiment of a drilling device according to the invention.

FIG. 1 shows a drilling tool 2 comprising a drill shaft having means 3 for locating the drilling tool in a drive device, such as in a chuck of a hammer, drill and a conveying screw 4, which, in use, conveys debris upwardly and out of a hole during a drilling operation. The drilling tool 2 further comprises a drill head 5, and a cutting plate, or blade 6 mounted in the drill head. The cutting blade 6 will be made of a hard metal or other abrasion-resistant cutting material. Such materials will be well-known to those skilled in the art and will not, therefore, be described in detail herein.

Figure 2:
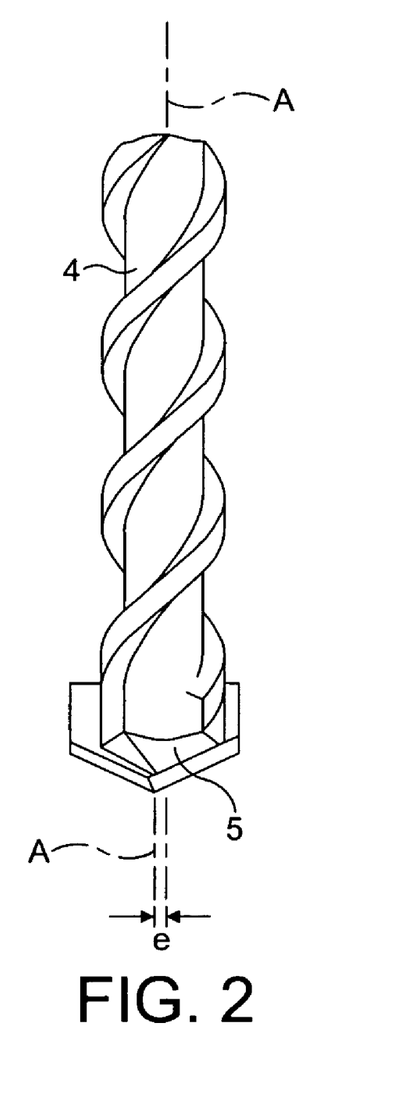
FIG. 2 is an enlarged view of the drill head of the drilling tool of FIG. 1.

The drilling tool 2 differs from standard drilling tools in that the cutting blade 6 is not symmetrically radially fixed in the drill head 5. Instead, as shown in FIG. 2, the cutting blade 6 is radially offset by an amount "e" with respect to the axis of symmetry, or rotation A, of the drilling tool 2.

Figure 3:
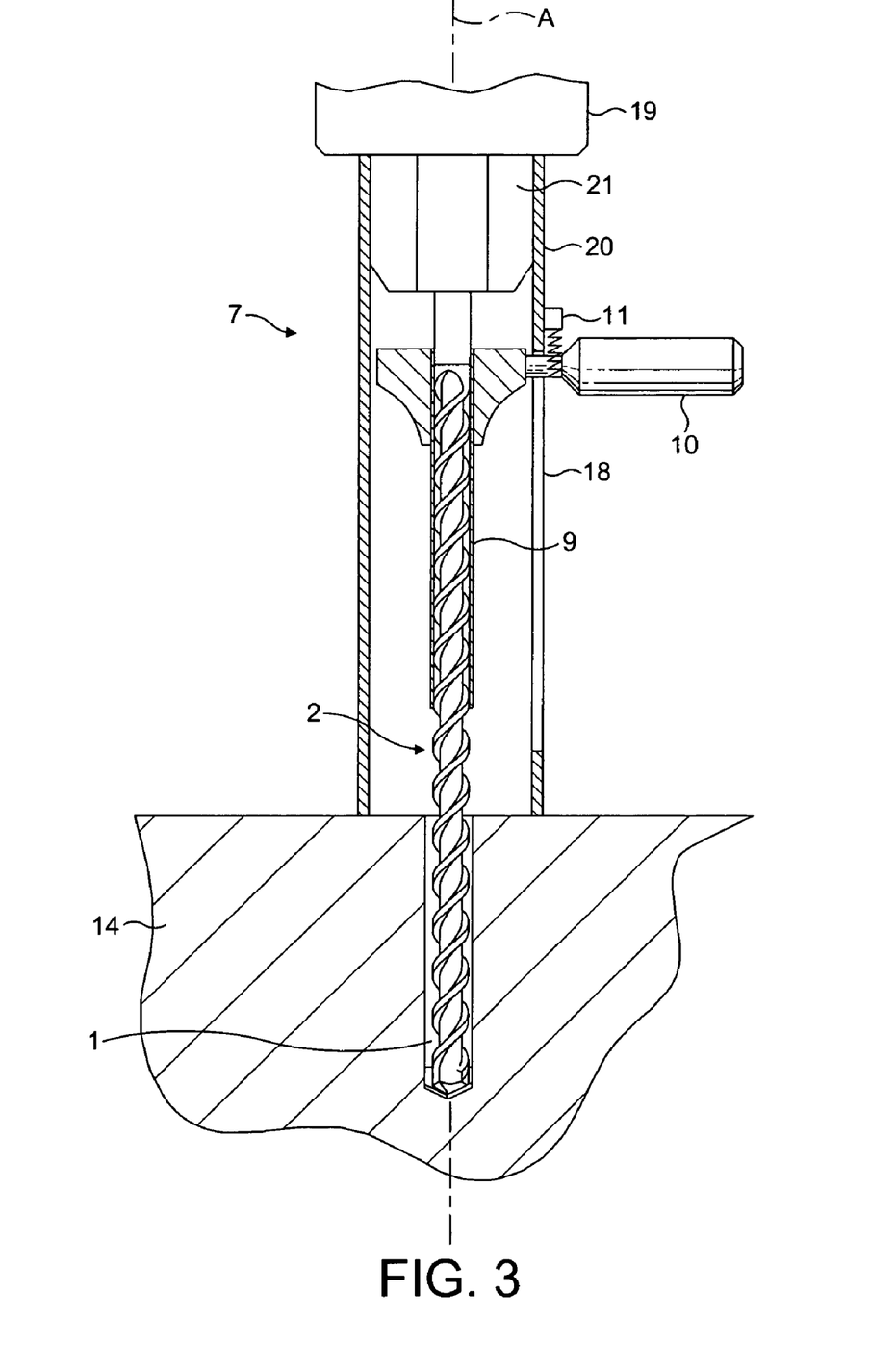
FIG. 3 shows a drilling device according to a first embodiment of the invention incorporating the drilling tool of FIG. 1.
Figure 4:
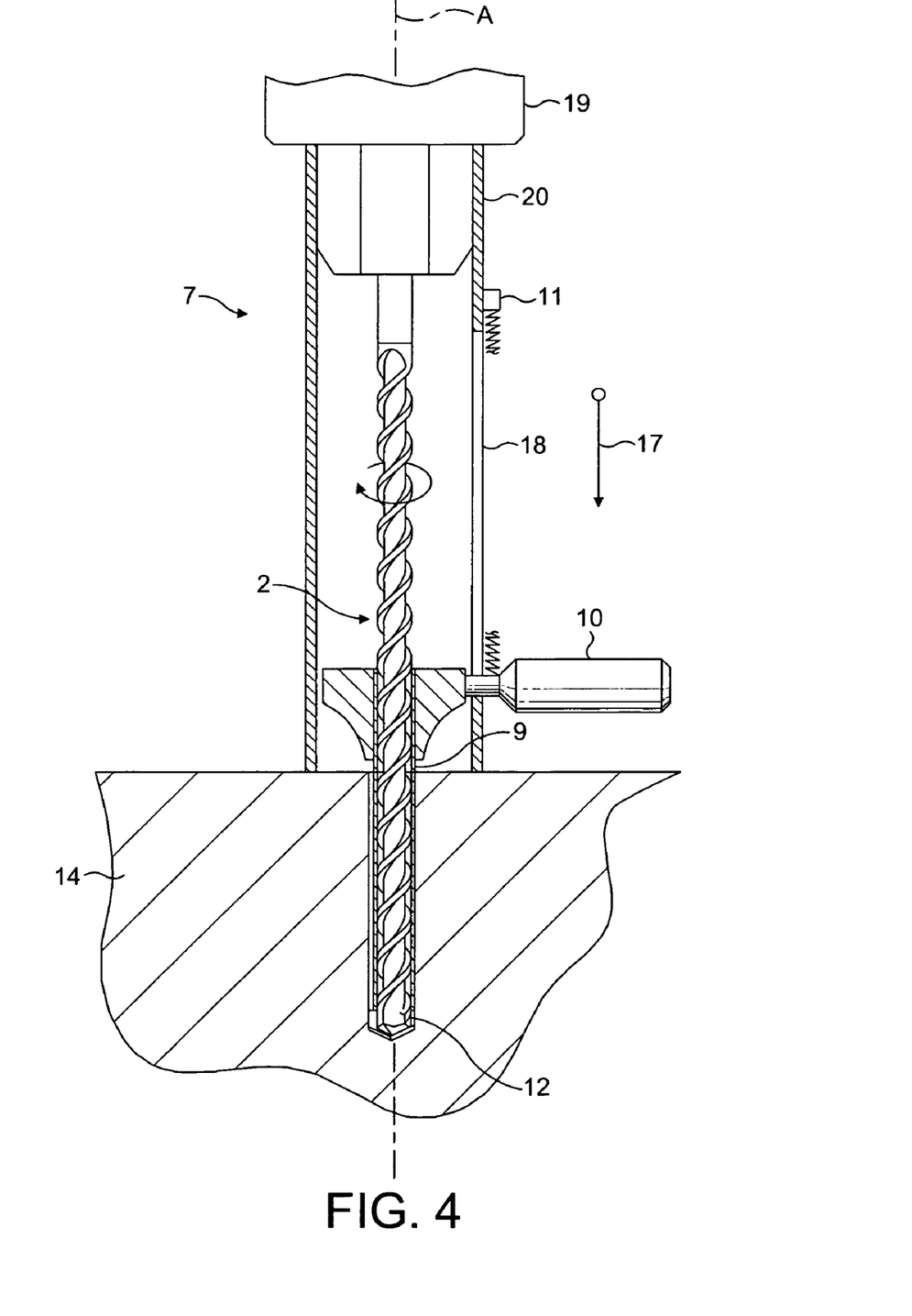
FIG. 4 shows the drilling device of FIG. 3 in a different operating position.

Referring to FIGS. 3 and 4, a drilling device 7 incorporating the drilling tool 2 includes a centering device in the form of a guide tube 9 fitted on the drill shaft. The guide tube 9 is arranged to be axially slidable on the drill shaft and is connected to a laterally projecting handle 10 by which the guide tube can be moved by an operator. The handle 10 projects from a longitudinally extending slot 18 provided in an outer tube, or sleeve, 20 that surrounds the drilling tool 2 and guide tube 9. The slot constrains the movement of the handle 10 so that the guide tube 9 can only move axially with respect to the drill shaft and for practical purposes cannot rotate. The outer tube 20 is fitted to a chuck 21 of a drive device, such as, for example, a hammer drill. The chuck 21 illustrated is an SDS chuck and projects from a body portion 19 of the hammer drill in a conventional manner. As is known to those skilled in the art, the outer portion of an SDS chuck does not rotate (the drilling tool 2 is rotated by an unillustrated internal part of the chuck. Thus, the outer sleeve 20 does not rotate when the drilling tool 2 rotates. A spring 11 is connected to both the handle 10 and the outer tube 20 and biases the guide tube 9 to the retracted, non-use, position shown in FIG. 3.

It will be understood that although illustrated in use with an SDS chuck, the drilling device 7 may alternatively be used with drilling machines fitted with conventional chucks. In this case, the mounting of the outer tube 20 will be such that the chuck can rotate freely and the outer tube 20 does not rotate. It will be appreciated that the outer tube 20 can be fitted to a hammer drill (or any other suitable drive machine that may be used to drive the drilling device 7) in any convenient way that provides for non-rotation of the outer tube 20 while the drilling tool 2 is freely rotatable.

Figure 5:
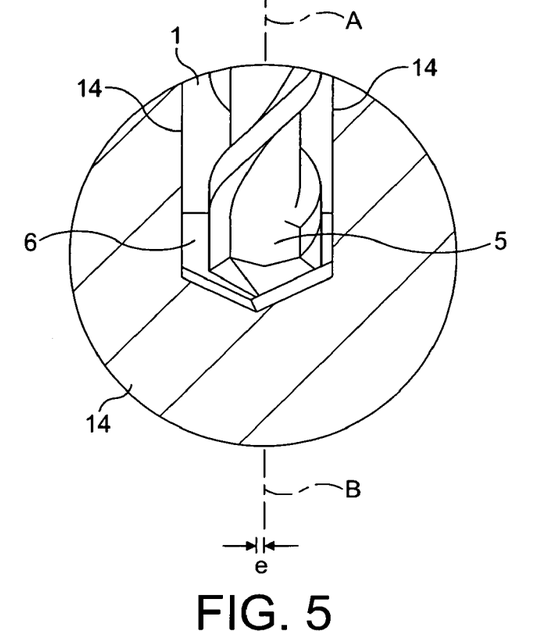
FIG. 5 is an enlargement of a portion of FIG. 3 showing the cutting portion of the drilling tool at the bottom of a drilled hole.

As shown in FIG. 3, in use, the drilling tool 2 is used to drill into a body, or component, such as a wall 14. As shown in FIGS. 3 and 5, the result is the production of a conventional plain cylindrical drilled hole 1. As a consequence of the asymmetrical positioning of the cutting blade 6, the operator will experience unsteady movement of the hammer drill as drilling is commenced. With reference to FIG. 5, it will be seen that because the cutting blade 6 is radially offset by the amount "e" with respect to the axis of rotation A of the drill shaft, the centre line B of the hole 1 is offset by the distance "e" with respect to the axis of rotation A.

Once the hole 1 has been drilled to its full depth, as determined by the leading end of the outer sleeve engaging the wall 14, in an immediately following step, without switching the hammer drill off or over, the operator grips the handle 10 and uses it to move the guide tube 9 down the drill shaft into the drilled hole 1. This is illustrated by FIG. 4. In FIG. 4, the guide tube 9 is shown at its fully extended position at the bottom of the drilled hole. The guide tube 9 is moved to this position by operating the handle 10 and while rotation of the drilling tool 2 is maintained. With the guide tube 9 in this position, radial widening of the bottom of the hole 1 occurs to produce an undercut 12.

Figure 6:
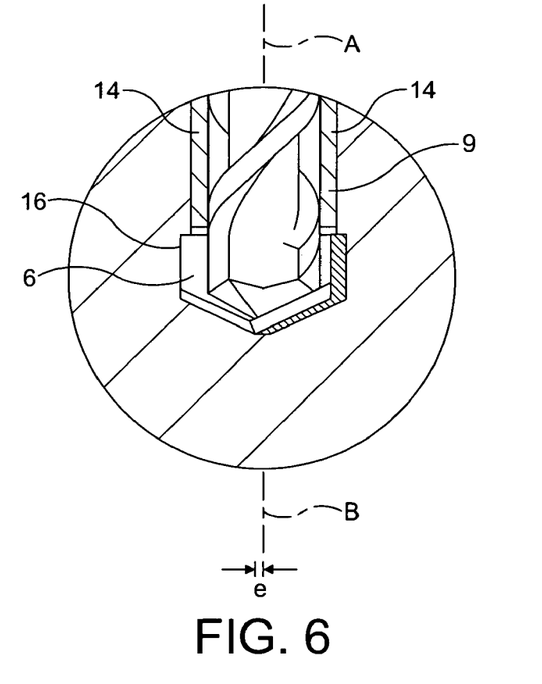
FIG. 6 is an enlargement of a portion of FIG. 4, similar to FIG. 5, but showing a guide tube of the drilling device at the bottom of the drilled hole.
Figure 7:
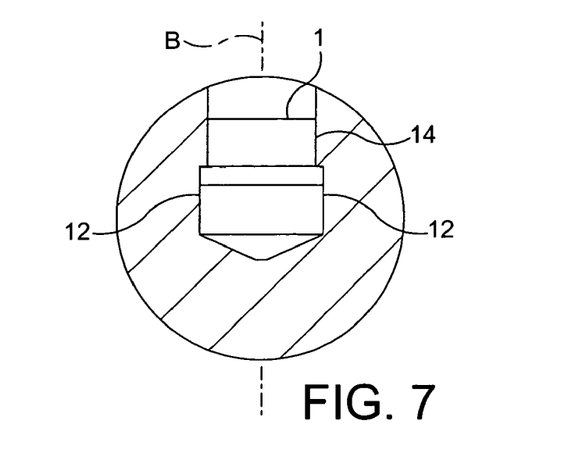
FIG. 7 shows an undercut hole produced using the drilling device illustrated by FIGS. 1 to 6.

In more detail, when the guide tube 9 is moved in the direction of advance 17 (FIG. 4) by use of the handle 10, the asymmetrically fixed cutting blade 6, is gradually forced into a central position thereby driving its radially outermost edge 16 (FIG. 6) into the wall 14 of the previously drilled hole 1. Since the edge 16 rotates continuously during this movement, it will remove further material from the wall 14 so that a radial widening is automatically obtained to produce an undercut 12 at the end of the hole 1. FIG. 7 shows the undercut 12 after the drilling tool 2 has been removed.

Figure 8:
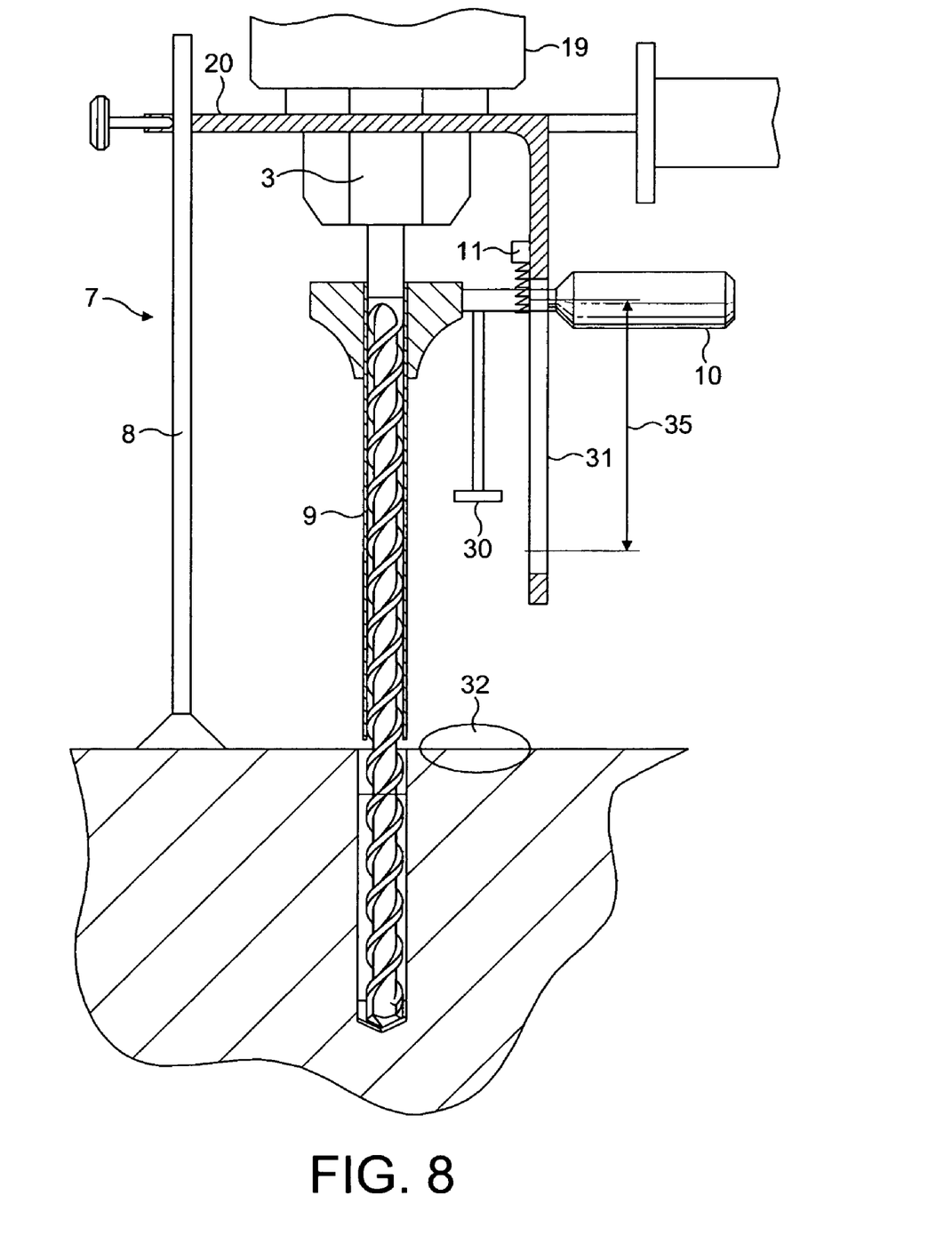
FIG. 8 is a view similar to FIG. 3 showing a second embodiment of a drilling device according to the invention.

FIG. 8 shows a second embodiment of the drilling device 7. For ease of reference, like reference numerals are used to indicate similar or identical parts. In this embodiment, the outer tube 20 is replaced by a generally L-shaped support 20 that cooperates with an adjustable depth stop 8. The handle 10 connects with the guide tube 9 via a slot 31 in a limb of the support 20 that extends parallel to the drilling tool 2 and sleeve 9. The slot allows the handle 10 to move axially, but substantially prevents rotational movement thereof. Accordingly, the operator can move the guide tube 9 axially on the drill shaft, but rotation of the guide tube 9 is substantially prevented.

A marking device 30 is carried by the handle 10 and is arranged to mark the part 14 being drilled at a position 32 when the undercut 12 is made. The marking device 30 will only mark the part 14 when the guide tube 9 is fully inserted in the hole to produce a fully formed undercut 12. The distance moved by the handle 10 to fully insert the guide tube 9 is indicated at 35.

The second embodiment of the drilling device 7 is operated in much the same way as the first embodiment. That is, a hole 1 is first drilled to a depth determined by the setting of the depth stop 8. The guide tube 9 is then slid down the drill shaft while rotation of the drilling tool is maintained. As before, the insertion of the guide tube centres the drill shaft in the hole, thereby driving the radially outermost edge 16 of the cutting blade into the wall of the drilled hole to produce an undercut, as illustrated by FIGS. 6 and 7. Once the operation is complete, the guide tube 9 is retracted and then the drilling tool 2 is removed from the hole, which has been marked as completed by the marking device 30.

The guide tube 9 is a relatively inexpensive part, which in view of the abrasion caused by the drilling dust in the inner wall, will wear. However, by simply releasing the handle 10, it can be quickly replaced, without the need for auxiliary or additional tools.

Figure 9:
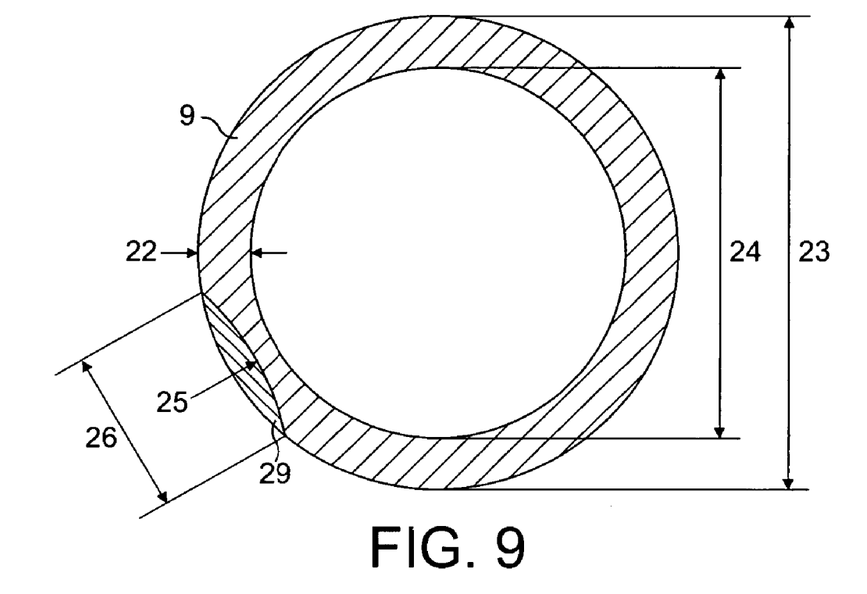
FIG. 9 is a plan view of a modified guide tube for drilling devices according to the invention.
Figure 10:
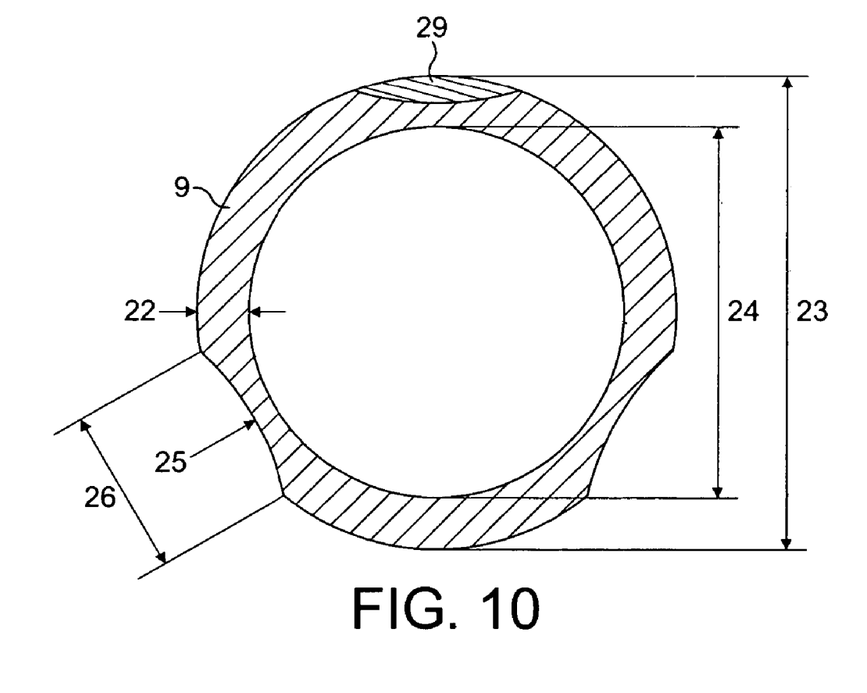
FIG. 10 is a plan view of an alternative modified guide tube for drilling devices according to the invention.

As illustrated by FIGS. 9 to 12, the external surface of the guide tube may be relieved to reduce the area of its surface that will contact the wall 14 of the hole 1. FIG. 9 shows a modified guide tube 9 with a recesses 29 defined by a radius 25. At the outer diameter 23 of the guide tube, the extent of the recess 29 is indicated as 26. As shown in FIG. 10, the guide tube 9 may be provided with a plurality of such recesses.

In its most basic form, the guide tube 9 is a plain cylinder with a wall thickness 22, outer diameter 23 and inner diameter 24. The provision of one or more recesses 29 has the advantage of reducing the area of its surface that contacts the wall 14 of the hole 1 and, in particular, in the case of brick or stone, provides the advantage of reducing the force used to insert the guide tube into the hole. The recesses 29 may be disposed symmetrically (as shown) or asymmetrically about the periphery of the guide tube 9, as desired.

Figure 11:
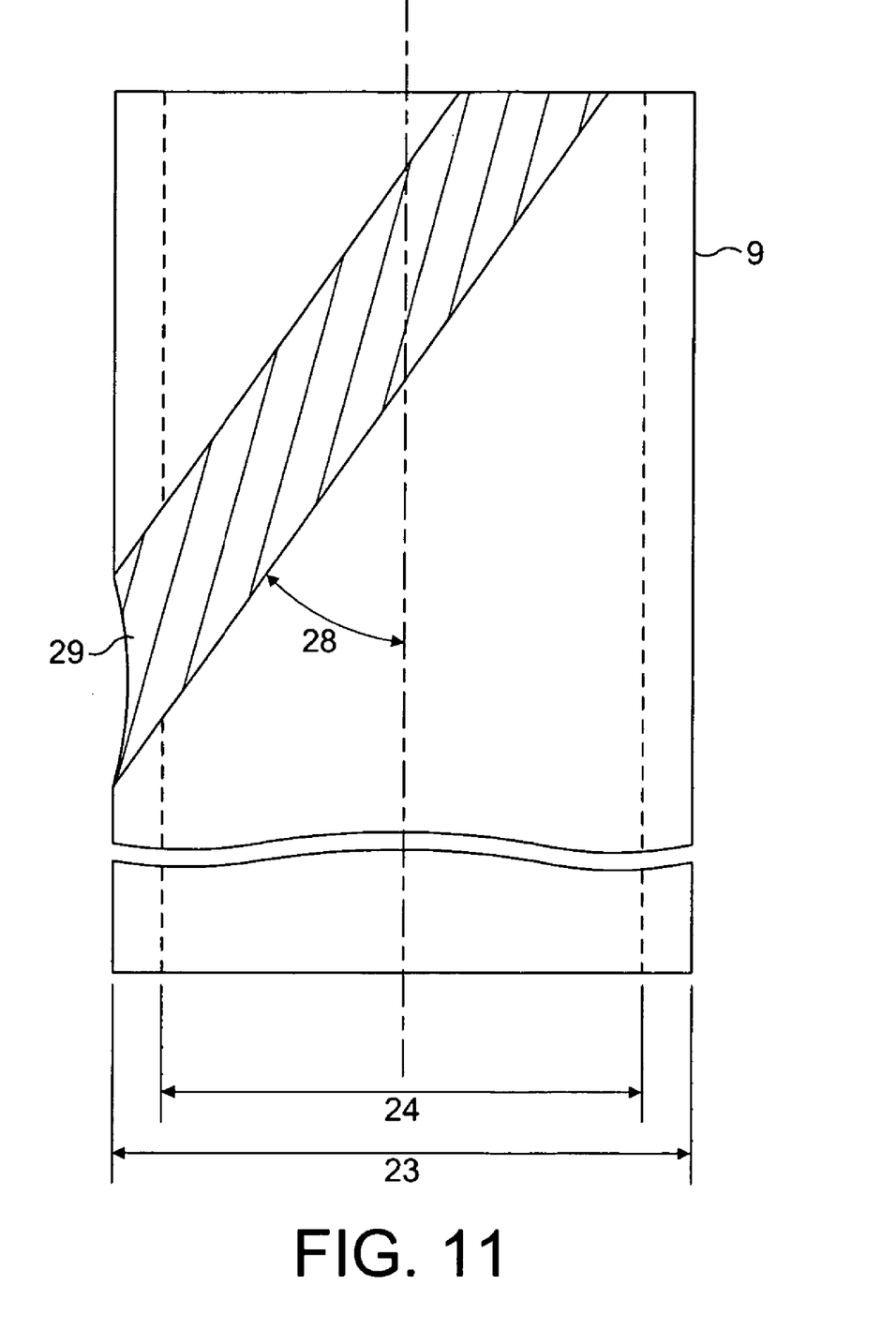
FIG. 11 illustrates yet another modification for the guide tube.

As illustrated by FIG. 11, the recess 29 may be twisted, or helical, with a pitch angle 28. More than one slanted recess 29 could be provided if desired.

Figure 12:
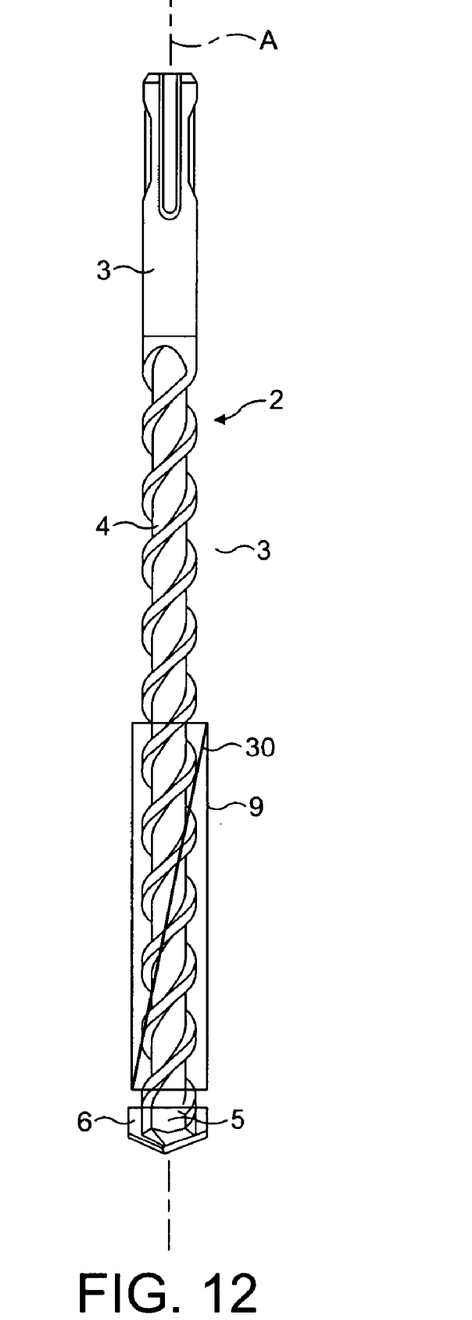
FIG. 12 shows yet another modified guide tube fitted to a drilling tool.

Referring to FIG. 12, the guide tube 9 may be formed by rolling a sheet to form a split sleeve having a longitudinally extending slit 30. Preferably, the slit 30 is twisted at a pitch angle so that the cutting blade 6 will not jam in the slit during the undercutting operation.

The guide tube shown in FIG. 12 can be used with drilling tools 2 where the diameter of the conveying screw part 4 is less than the diameter of the locating means 3 such that the sleeve cannot be slid onto the drill shaft over the locating-means 3. Although it is preferable that the slit 30 does not run parallel to the axis A of the drill shaft, the slit may be so-aligned.

In a further, non-illustrated, variation, the guide tube 9 could be surface relieved by perforating the guide tube. Advantageously, the guide tube could be made from a perforated material.

Figure 13:
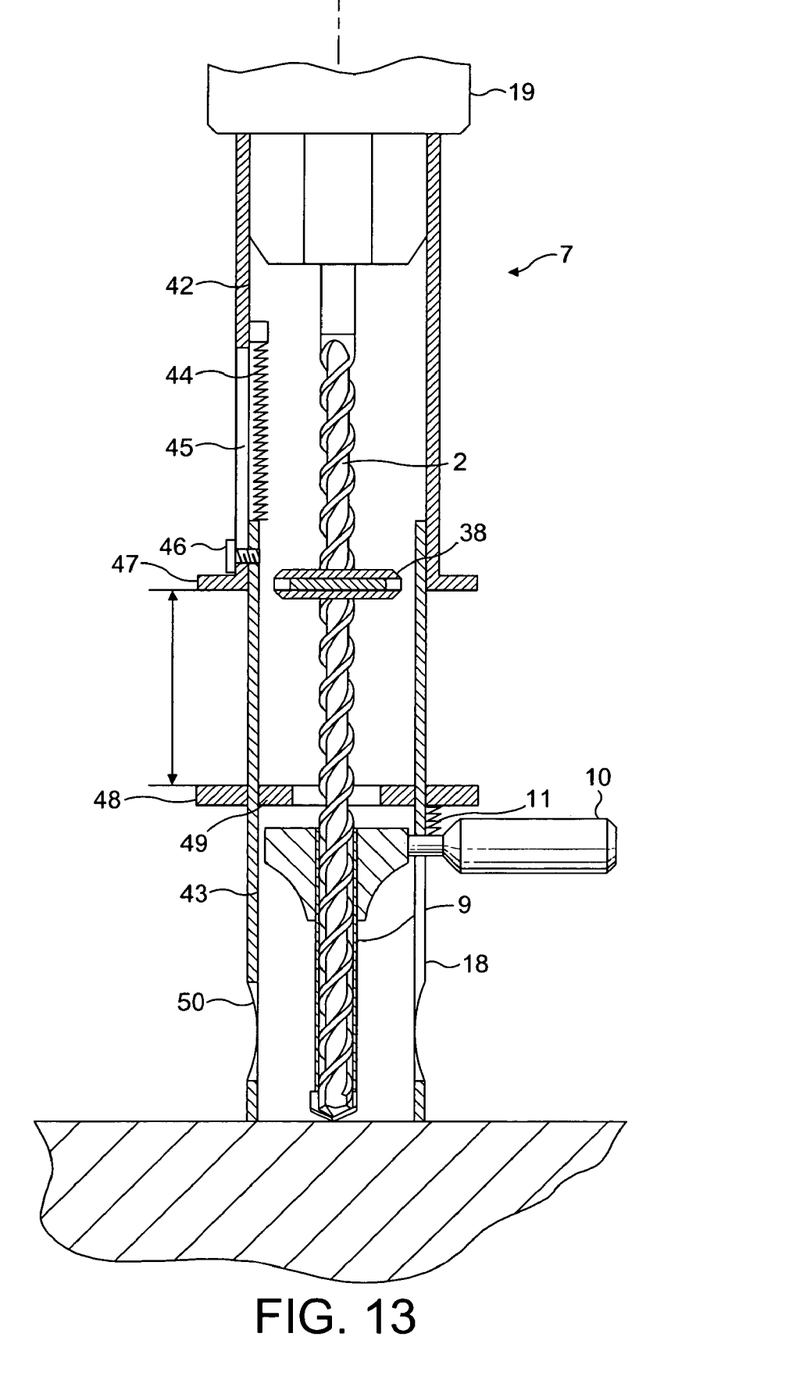
FIG. 13 is a view similar to FIG. 3 showing a third embodiment of a drilling device according to the invention.

FIG. 13 shows a third embodiment of the drilling device 7 in which, in contrast to the embodiment shown in FIGS. 3 and 4, the depth stop system is provided inside telescopic outer tubes 42 and 43, which replace the outer tube 20.

FIG. 13 shows the third embodiment in position at the commencement of a drilling operation. For ease of reference, like or similar parts will be referenced by the same reference numerals as in the previously described embodiments. In this embodiment the previously described outer tube 20 is replaced by a telescopic tube arrangement comprising at least two tubes 42, 43. The upper telescopic tube 42 is fastened to the hammer drill 19 and the lower telescopic tube 43 is connected to the tube 42. The lower telescopic tube 43 is secured to the upper telescopic tube 42 by means of a screw 46 that penetrates an elongate slot 45 provided in the upper telescopic tube. This slot 45 is sufficiently long to permit the tubes 42, 43 to telescope as the drilling tool 2 moves to a predetermined depth defined by stops 47, 48. The telescoping movement of the tubes 42, 43 is made against a spring 44 that biases the lower telescopic tube 43 to its fully extended position.

Figure 14:
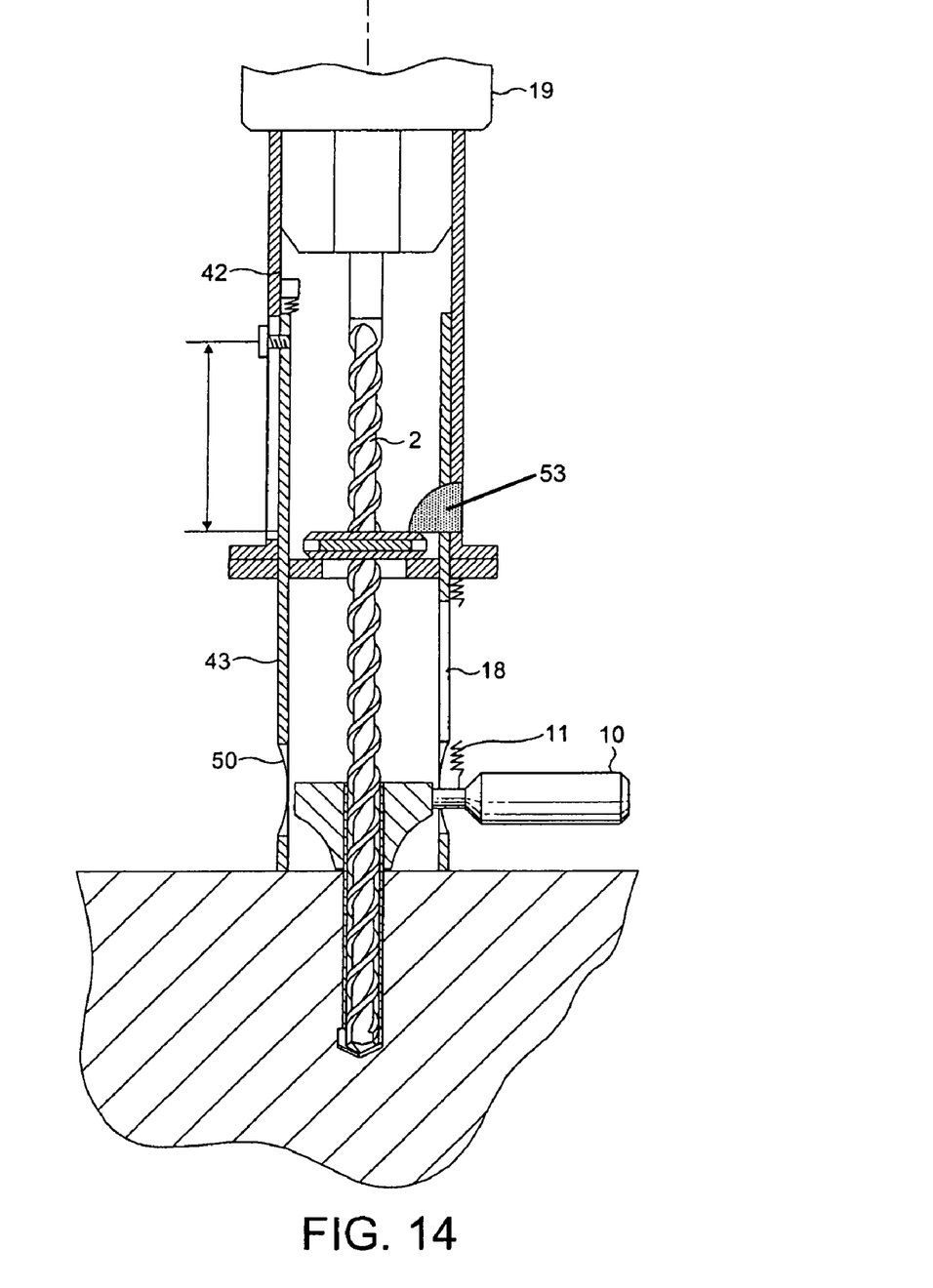
FIG. 14 shows the drilling device of FIG. 13 in a different operating condition.

The drilling depth is determined by an upper stop 47 and a lower stop 48 and by a support ring 38 fixed on the drilling tool 2 in conjunction with a second lower stop 49. The supporting ring 38 will typically be secured to the drill shaft by means of a screw or by welding, although other means of securement could be used. As shown in FIG. 14, the drilling tool can be axially fixed at the drilling depth position by an optional releasable locking means 53. It will be appreciated that in alternative arrangements, the drilling depth may be determined simply by the stops 47, 48 or the support ring 38 and stop 49 alone.

After the drilling depth has been reached, the undercut is made as follows. The handle 10, previously held in the position shown in FIG. 13 by a spring securing device 11 is moved downwards in the slot 18, which in this embodiment is in the lower telescopic tube 43, pushing the guide tube 9 into the drilled hole. When the guide tube 9 reaches the fully inserted position shown in FIG. 14, the undercutting operation is complete and the volume of structural material removed by the undercutting process can be seen through at least one inspection window 50 provided in the lower telescopic tube 43. The opening 50 also provides a means of discharging the volume of drilled material to ensure a fault-free drilling process, even when the dimensions are larger. It will be appreciated that in an analogous manner, the outer tube 20 shown in FIGS. 3 and 4 may be provided with one or more apertures.

This manner of operation, shown in FIGS. 13 and 14, avoids numerous causes of faults during rough operation in a building site environment associated with a number of components, such as the depth stop, since all of the critical functional elements that have a strong influence on the overall process are in a protected position inside the two telescopic tubes 42 and 43 and need not be adjusted relative to one another. This is another advantage that increases reliability of the drilling device.

Figure 15:
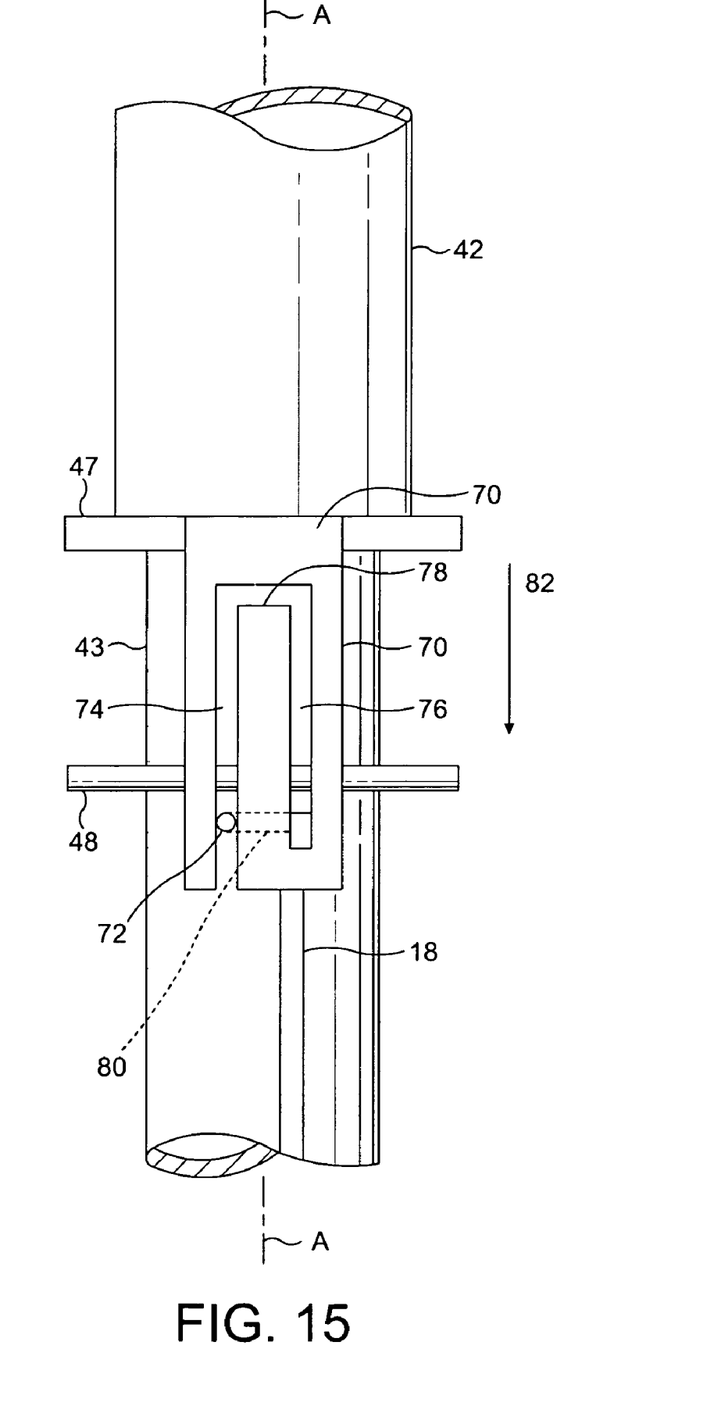
FIG. 15 is a partial view of the third embodiment showing a possible modification.

FIG. 15 shows a modification of the third embodiment, by which the operator of the drilling device 7 is prevented from moving the guide tube 9 into the hole 1 until the drilling tool 2 has drilled the hole to its full depth, as determined by the depth stops 47, 48 and/or 38/39.

Referring to FIG. 15, the upper, or outer, telescopic tube 42 has a guide member 70 for the handle 10 fitted to it. The guide member 70 defines a slot, in which a narrow portion 72 of the handle 10 is received (the larger diameter portion of the handle, as shown in FIGS. 13 and 14, has been omitted for clarity). The slot has a first elongate portion 74 that extends parallel to the axis of rotation A of the drilling tool 2 (not shown in FIG. 15) and a second elongate portion 76 that is spaced from and extends parallel to the first elongate portion 74. The two elongate portions are connected by a transverse extending connecting portion 78, which in this example extends perpendicular to the axis of rotation A. The arrangement of the slot portions 74, 76, 78 is such that the slot is generally U-shaped. Although not shown, the corners of the slot are preferably curved to make movement between the portion 74, 76, 78 smoother.

The slot 18 in the lower, or inner, telescopic tube 43 is aligned with the second elongate portion 76 and includes a transverse extension 80 that extends from the upper end of the slot 18 and is positioned behind the guide member 70. The transverse extension 80 of the slot 18 extends sufficiently for the narrow portion 72 of the handle to be received in the first elongate portion 74 while the second elongate portion 76 is aligned with the slot 18 in the lower telescopic tube 43.

FIG. 15 shows the modified third embodiment in the drilling position illustrated by FIG. 13. In this position, the narrow portion 72 of the handle is positioned in the slot extension 80 and at the lower end of the first elongate portion 74. When drilling of the hole 1 commences, the upper telescopic tube 42 moves downwardly relative to the lower telescopic tube 43 as indicated by the arrow 82. As this happens, the guide member 70 is also moved downwardly relative to the handle 10 so that in effect, the narrow portion 72 of the handle approaches the top of the first elongate portion 74, although, of course, the handle does not move. The handle is at this stage prevented from moving in the slot 18, 80.

When the drilling operation is complete and the full hole depth is reached, the narrow portion 72 of the handle is positioned at the top of the first elongate portion 74. The operator can then move the handle across with the narrow portion 72 of the handle simultaneously moving along the connecting portion 78 and the slot extension 80. This brings the narrow portion 72 of the handle into the upper end of the second elongate portion 76, which is aligned with the slot 18. The handle 10 can then be pushed downwards forcing the guide tube 9 into the hole 1 and allowing it to be moved to the position shown in FIG. 14 to form an undercut, as previously described.

It will be appreciated that the length of the first elongate portion 74 is such that the narrow portion 72 of the handle is held in the first elongate portion until the full hole depth (as determined by the stops) is drilled and only then is the handle able to move transversely to bring it into a position at which downward movement of the guide tube 9 can commence. Similarly, the length of the second elongate portion 76 is such that the handle can move the distance necessary to allow the guide tube 9 to be inserted to the desired depth in the drilled hole 1. Preferably, this brings the leading end of the guide tube 9 to a position just behind, or adjacent to, the cutting blade 6.

It will be understood that further modifications to the principle illustrated by FIG. 15 are possible. For example, the shape of the slot defined by the guide member 70 could be altered as desired. All that is required is that the arrangement of the slot in the guide member 70 and the slot 18 in the lower telescopic tube is such that the handle 10 cannot be operated to move the guide tube 9 into the hole 1 until the full depth has been drilled. As another example, it is not necessary for the lower end of the first elongate portion 74 to be open as shown. This is merely convenient.

It will be understood that the arrangement shown in FIG. 15 might be modified to allow for more than one depth setting. In this case, a second transverse connecting portion (not shown) could branch from the first elongate portion (for example in the opposite direction to the connecting portion 78) to a third elongate portion (not shown). Similarly, the extension 80 of the slot 18 could then extend further in the same direction to a second slot in the telescopic tube, which would be aligned with the third elongate portion. This could of course be matched to a desired drilling depth with a second drill stop setting. Further modifications would be possible to provide an arrangement similar to the gate of an automobile gearbox, so that multiple depth stops could be provided for.

Figure 16:
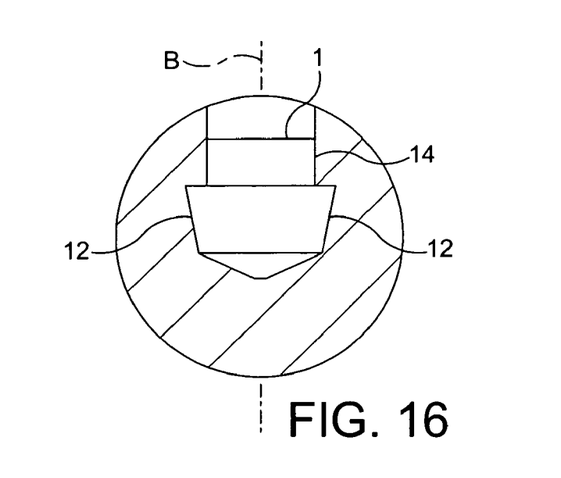
FIG. 16 shows another form of undercut hole that can be produced by drilling devices according to the invention.
Figure 17:
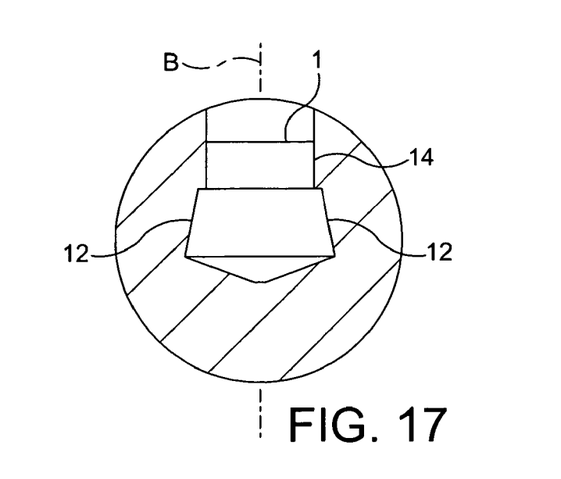
FIG. 17 shows yet another form of undercut hole that can be produced by drilling devices according to the invention.

FIG. 16 shows a variation of the radial widening or undercut that can be obtained with a suitably modified cutting blade 6. Similarly, FIG. 17 shows another variant of the radial widening or undercut in detail.

The drilling devices illustrated by the embodiments are technically simple, but efficient and potentially completely reliable.

It will be appreciated that the embodiments provide a drilling device that can produce an undercut hole using a single drilling tool by means of two steps taken in direct succession, without needing to remove the drilling tool from the basic hole and without using an additional "special tool". Therefore, it is not necessary to perform the drilling and undercutting operation as two quite distinct steps involving the changing of tools or resetting of the machine/drilling device. This avoids the need for an additional drilling device and/or an additional machine operator and ensures, during rough operation on site, that "not a single hole is forgotten" during "undercutting/widening", which can be the case where a second distinct operation is required.

Furthermore, usually the basic drilling operation is accelerated by so-called hammer drilling, i.e. the tool is axially accelerated in rotation by striking mechanisms. With existing systems, hammer drilling during the undercutting operation must be avoided, and may in practice result in occasional faulty operation and failure of the entire system, for example, in a useless hole at a necessarily predetermined position. This may spoil an entire job. The drilling devices of the embodiments can reliably produce a satisfactory undercut while still hammer drilling.

In the embodiments, the centering device takes the form of a guide tube 9 that is mounted on and is slidable relative to the drilling tool 2. It will, however, be understood that this is not essential. The centering device could take the form of one or more elongate members (like fingers) arranged to be insertable into the hole to provide a laterally acting force on the drilling tool 2 that will move the axis of rotation A towards the hole centreline B. Advantageously, three equi-spaced fingers could be supported on a collar that could then be connected with a handle in the same way as the guide tube 9.

An advantage of the drilling devices of the embodiments is that the operation of radially undercutting a drilled hole to provide a positive connection for a fixing element (such as a dowel), is performed in a staggered operating sequence in two successive steps with a single drilling tool. During this process, the cutting portion of the drilling tool does not leave the drill hole, which is advantageous with regard to the process and organisation. While the hole is initially drilled, the centering device remains inoperative at the upper end of the drilling tool.

By means of the centering device, which is moved axially downwards along the drilling tool and can be in contact with or partially spaced from the drilling tool, the offset cutting blade is deflected by a predetermined amount to effect the desired undercut. This co-operation of the centering device and drilling tool results in the advantage for the user of obtaining defined changes in shape or undercut in a single operation that is reproducible, reliable and practical.

It will be appreciated that by suitably shaping the outermost edge 16 of the cutting blade 6, it is possible to produce undercuts of varying shape. As shown in FIGS. 7, 15 and 16, the undercut may be plain cylindrical (generally circular in cross-section) or it may be conical. A conical undercut can have sides that taper inwardly towards the bottom of the hole (FIG. 15) or taper inwardly towards the top of the hole (FIG. 16) depending on the shape of the cutting blade. Of course, other shapes are possible.

It will be understood that while the preferred embodiments have been described as separate and distinct embodiments, features of the individual embodiments can readily be applied to the others to provide yet more embodiments. For example, it would be possible to provide a marking device, for example a colour marking device, with any of the embodiments.

In the embodiments, the guide tube 9 is shown fitted with a handle 10 by which the guide tube is moved manually by the drill operator. However, it will be understood that a mechanism could be provided by which the guide tube would be non-rotationally driven by take-off from the chuck drive.

While the invention is not limited to this, with presently preferred embodiments, the diameter of the drilled hole relative to the widening produced by the undercut is substantially in the range 1:1.05 to 1:1.35. Alternatively, a ratio of 1.025 to 1.175 is preferred.

In the preceding description, reference has been made to "upper" and "lower" and "upward" and "downward" movement. It is to be understood that this should not be taken as limiting and this language is used merely for convenience of description in conjunction with the arrangement as illustrated. It will be appreciated that the drilling device can readily be used to drill: upwards, for example into a ceiling; transversely, for example into a wall; and downwardly, for example into a floor.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A drilling device for producing undercut holes, said drilling device comprising:
    a drilling tool comprising a drill shaft that defines an axis of rotation of said drilling tool and a cutter carried at an end region of said drill shaft such that, in use, it drills a hole having a longitudinal axis that is radially offset with respect to said axis of rotation; and
    a centering device operable to apply a lateral force to said drilling tool for moving said axis of rotation towards said longitudinal axis to cause said cutter to form an undercut in a said hole, said centering device including;
    a centering member that is movable from a non-operative position outside of said hole to an operative position inside said hole in which the member is positioned between said drill shaft and a wall defining said hole so as to provide said lateral force;
    an operating device connected with said centering member by which an operator can move said centering member from said non-operative position to said operative position;
    a depth stop device by which a drilling depth of said hole is set; and
    a control device for said operating device, said control device being configured to prevent movement of said operating device by which said centering member is moved from said non-operative position to said operative position until said drilling tool has drilled said hole to said drilling depth set by said depth stop device.

2. The device of clam 1, wherein said control device comprises a gate member defining a slot for receiving a portion of said operating device, said slot being configured to prevent movement of said portion that would move said centering member from said non-operative to said operative position until said drilling tool has drilled said hole to said drilling depth set by said depth stop device.

3. The device of claim 1, wherein said centering device further comprises a support device to be mounted to a drilling machine and support the machine against a part being drilled, at least when said undercut is being formed,
    said support device comprising a first support member and a second support member telescopically connected with said first member,
    said first support member having a first part of said control device which first part is provided with an aperture through which a portion of said operating device extends, said aperture defining a first movement path for said portion of the operating device, said first movement path having a first portion configured such that when said portion of the operating device is received therein said operating device cannot move said centering member from said non-operative to said operative position and a second portion configured such that when said portion of the operating device is received therein said operating device can move said centering member from said non-operative to said operative position, and
    said second support member having a second part of said control device which second part is provided with an aperture through which said portion of the operating device extends, said aperture of said second part defining a second path along which said second portion of the operating device can move, said second path having a first portion configured such that when said portion of said operating device is received therein said portion of said operating device is held in said first portion of said first movement path and a second portion configured such that when said portion of the operating device is received therein, said portion of said operating device can be moved from said first portion of said first movement path into said second portion of said first movement path.

4. The device of claim 3, wherein said first movement path is defined by a substantially L-shaped aperture.

5. The device of claim 3, wherein said second path includes a third portion extending from said second portion and aligned with said second portion of the first movement path, said portion of the operating device moving along said third portion as it moves along said second portion of the first movement path.

6. The device of claim 5, wherein said second path is substantially U-shaped.

7. The device of claim 3, wherein said first and second support members are tubular members and said aperture defining said first movement path is a slot defined by said first tubular support member.

8. The device of claim 3, wherein said aperture defining said second path is defined by a member secured to said second support member.

9. The device of claim 3, wherein said first support member is connected with said drilling machine via said second support member and said second support member moves telescopically relative to said first support member when said drilling tool is drilling said hole.

10. The drilling device of claim 1, further comprising a support device to be mounted on a drilling machine and support the machine against a part being drilled, at least when said undercut is being formed, said support device comprising a first support member and a second support member telescopically connected with said first support member such that said support device has a length that is variable and arranged such that said length reduces during drilling of said hole, said first support member and said second support member each having a part of said control device, said parts of the control device each having an aperture through which a portion of said operating device extends which apertures define respective movement paths along which said portion of the operating device can pass, each movement path having an elongate portion extending substantially parallel to said axis of rotation and a transverse extending portion, said portion of the operating device being held in the transverse extending portion of said first support member movement path by said elongate portion of said second support member movement path as the second support member moves relative to said support member and said length reduces and being permitted to move from said transverse extending portion of the first support movement path into the elongate portion thereof when said second support member has moved relative to said first support member a distance corresponding to said drilling depth so as to bring said transverse extending portion of said second support movement path into overlying relationship with said transverse extending portion of said first support movement path.

* * * * *